United States Patent
Lalouette (10) Patent No.: US 11,248,153 B2
(45) Date of Patent: Feb. 15, 2022

(54) SEATING SYSTEM HAVING PRESSURE COMPENSATING FLUID WITH THERMAL ABSORPTION AND DISTRIBUTION PROPERTIES

(71) Applicant: Sunrise Medical (US) LLC, Fresno, CA (US)

(72) Inventor: Marc Lalouette, Evergreen, CO (US)

(73) Assignee: Sunrise Medical (US) LLC, Fresno, CA (US)

(*) Notice: Subject to any disclaimer, the term of this patent is extended or adjusted under 35 U.S.C. 154(b) by 0 days.

(21) Appl. No.: 16/616,889

(22) PCT Filed: May 25, 2018

(86) PCT No.: PCT/US2018/034737
§ 371 (c)(1),
(2) Date: Nov. 25, 2019

(87) PCT Pub. No.: WO2018/218202
PCT Pub. Date: Nov. 29, 2018

(65) Prior Publication Data
US 2021/0147735 A1  May 20, 2021

Related U.S. Application Data (60) Provisional application No. 62/510,814, filed on May 25, 2017.

(51) Int. Cl.
*C09K 5/06* (2006.01)
*A61G 5/10* (2006.01)
*A61G 5/04* (2013.01)

(52) U.S. Cl.
CPC ............... *C09K 5/063* (2013.01); *A61G 5/04* (2013.01); *A61G 5/1045* (2016.11); *A61G 5/1048* (2016.11)

(58) Field of Classification Search
CPC .... C09K 5/063; A61G 5/1048; A61G 5/1045; A61G 5/04; A47C 7/021; A47C 7/022; A47C 7/18
(Continued)

(56) References Cited

U.S. PATENT DOCUMENTS

| | | |
|---|---|---|
| 4,038,762 A | 8/1977 | Swan |
| 5,290,904 A | 3/1994 | Colvin et al. |

(Continued)

FOREIGN PATENT DOCUMENTS

| | | |
|---|---|---|
| WO | 0005970 A1 | 2/2000 |
| WO | 2006100558 A1 | 9/2006 |

OTHER PUBLICATIONS

PCT/US2018/034737 International Search Report and Written Opinion, dated Aug. 24, 2018.
(Continued)

*Primary Examiner* — Mark R Wendell
(74) *Attorney, Agent, or Firm* — MacMillan, Sobanski & Todd, LLC (57) ABSTRACT

A seating system, particularly suited for personal mobility vehicles, such as wheelchairs, that includes a seat cushion having pressure relieving properties and enhanced thermal absorption properties. The seat cushion includes a thixotropic fluid contained within a flexible envelope. The thixotropic fluid includes a phase change material that enhances the thermal absorption properties of the seat cushion to increase thermal absorption from a seated user to provide a reduced temperature sensory effect. The thixotropic fluid further includes a thermal conduction medium that facilitates heat distribution to the phase change material.

20 Claims, 8 Drawing Sheets

(58) Field of Classification Search
USPC .................................................. 297/452.41
See application file for complete search history.

(56) References Cited

U.S. PATENT DOCUMENTS

| | | | |
|---|---|---|---|
| 5,837,002 | A | 11/1998 | Augustine et al. |
| 5,869,164 | A | 2/1999 | Nickerson et al. |
| 6,699,266 | B2 | 3/2004 | Lachenbruch et al. |
| 6,703,127 | B2 | 3/2004 | Davis et al. |
| 6,803,083 | B2 | 10/2004 | Ensinger |
| 6,996,864 | B2 | 2/2006 | Call |
| 7,780,713 | B2 | 8/2010 | Roberts |
| 9,408,475 | B2 | 8/2016 | Mikkelsen et al. |
| 10,329,469 | B2* | 6/2019 | Peterson .............. A47C 21/046 |
| 10,765,577 | B2* | 9/2020 | Lachenbruch ..... A61G 7/05784 |
| 2003/0109908 | A1* | 6/2003 | Lachenbruch ....... A47C 27/148 607/96 |
| 2005/0127631 | A1* | 6/2005 | Schaffner ............. A61G 5/1089 280/124.1 |
| 2007/0246157 | A1 | 10/2007 | Mason et al. |
| 2014/0141233 | A1 | 5/2014 | Crawford et al. |
| 2016/0289467 | A1 | 10/2016 | Yoo et al. |
| 2017/0037215 | A1* | 2/2017 | Crawford ............. A47C 21/046 |

OTHER PUBLICATIONS

EP18806460.4 extended European Search Report, dated Jan. 26, 2021.

* cited by examiner

SEATING SYSTEM HAVING PRESSURE COMPENSATING FLUID WITH THERMAL ABSORPTION AND DISTRIBUTION PROPERTIES

CROSS-REFERENCE TO RELATED APPLICATIONS

This application is the U.S. National Phase of International Application PCT/US2018/034737, filed May 25, 2018 which designated the U.S. and that International Application was published in English under PCT Article 21 (2) on Nov. 29, 2018 as International Publication Number WO 2018/218202. PCT/US2018/034737 claims the benefit of the U.S. Provisional Application No. 62/510,814, filed May 25, 2017. Thus, the subject nonprovisional application claims priority to U.S. Provisional Application No. 62/510,814, filed May 25, 2017. The disclosures of both applications are incorporated herein by reference in their entirety.

BACKGROUND OF THE INVENTION

This invention relates in general to seating systems. In particular, the invention relates to pressure relieving seats having enhanced thermal conduction properties. In at least one embodiment, the invention provides a fluid-filled, pressure compensating seat cushion, particularly suited for personal mobility vehicles, having an adjustable thermal absorption characteristic.

Seating systems, particularly for personal mobility vehicles, such as wheelchairs, having fluid-filled cushions are known in the art. Once such type of cushion and fluid system is disclosed in U.S. Pat. No. 5,869,164 to Nickerson, et al., the disclosure of which is incorporated by reference in its entirety. This type of fluid-filled cushion utilizes a thixotropic fluid formed from an oil and a block polymer. The block polymer includes both oil-compatible and oil-incompatible portions of the polymeric chain. Microspheres are added to decrease the fluid density and the overall weight of the cushion and to provide an adjustment to fluid viscosity. The resulting thixotropic fluid provides support by conforming to the contours of contacted body parts, deforms in response to a continuously applied pressure, and maintains the deformed shape and position in the absence of the continuously applied pressure.

The fluid, particularly when positioned in a stabilized temperature environment, does not promote a desired level of heat movement from the seated user (heat source) into the fluid and on to the surrounding thermal environment. Such heat movement away from a user has a comforting feel, much like the familiar feel of a cool pillow. The movement of heat away from the area of user contact influences both the temperature and humidity levels of the microclimate of the cushion-body interface, which impacts metabolic and physical conditions of the user's skin. Since comfort levels are influenced by heat and moisture characteristics, reducing heat and moisture levels provides an increase in comfort level. Thus, it would be desirable to improve the heat storage removal and capability of a pressure compensating, fluid-filled seat cushion.

SUMMARY OF THE INVENTION

This invention relates to personal mobility seating systems. In particular, the invention relates to pressure relieving seat cushions having enhanced thermal conduction properties.

In one embodiment, a cushion of a wheelchair seat or backrest comprises a flexible polymer envelope and a thixotropic fluid contained within the flexible polymer envelope. The thixotropic fluid includes a base fluid containing an encapsulated phase change medium having a phase change temperature between a solid phase and a liquid phase within a range of 20 degrees Celsius to 40 degrees Celsius and a thermal conduction medium. In one aspect of the embodiment, the thermal conduction medium is a micro-sized particulate material having a particle size 1 micron or less. The thermal conduction medium may be one of graphite, graphene, carbon graphite nanotubes, industrial diamond particulates, silver, aluminum, boron nitride, or copper. The thixotropic fluid has a viscosity in a range of about 100,000 to 300,000 cP. The phase change medium may be a paraffin material contained within one of a polymer or plastic encapsulant and provided in a weight range of up to 46% of the base fluid where the encapsulant is a microsphere containing the phase change medium. In another aspect of the embodiment, the phase change medium is a plurality of the microspheres containing paraffin that are added to the base fluid in a weight range of about 30%-40%.

In another embodiment, a cushion of a wheelchair seat or backrest comprises a flexible polymer envelope and a thixotropic fluid contained within the flexible polymer envelope. The thixotropic fluid includes a base fluid containing an encapsulated phase change medium having a phase change temperature between a solid phase and a liquid phase within a range of 20 degrees Celsius to 40 degrees Celsius and a thermal conduction medium. The base fluid contains one of a polyalphaolefin (PAO) oil, a polybutene oil, a dialkyl carbonate oil, and/or a silicone oil. The encapsulated phase change medium is a plurality of microspheres containing a paraffin where the microspheres have a size within a range of 14 microns to 24 microns. The thermal conduction medium is a graphite particulate having a size of 1 micron or less, and the thixotropic fluid has a viscosity in a range of about 100,000 to 300,000 cP.

In yet another embodiment, a cushion of a wheelchair seat or backrest comprises a flexible polymer envelope and a thixotropic fluid contained within the flexible polymer envelope. The thixotropic fluid includes a base fluid containing an encapsulated phase change medium having a phase change temperature between a solid phase and a liquid phase within a range of 20 degrees Celsius to 40 degrees Celsius and a thermal conduction medium. The base fluid comprises a vegetable oil. The encapsulated phase change medium is a plurality of microspheres containing a paraffin where the microspheres having a size within a range of 14 microns to 24 microns. The thermal conduction medium is a graphite particulate having a size of 1 micron or less, and the thixotropic fluid has a viscosity in a range of about 100,000 to 300,000 cP. In one aspect of this embodiment, the vegetable oil is one of canola, olive, corn, safflower, rapeseed, sunflower, castor, soy, coconut, palm oils, or a mixture of vegetable oils. In another aspect, the graphite material is in a weight fraction of up to 7% and the encapsulated phase change medium is in a weight fraction of up to 46%.

In yet another embodiment, a cushion of a wheelchair seat or backrest comprises a flexible polymer envelope and a thixotropic fluid contained within the flexible polymer envelope. The thixotropic fluid includes a base fluid containing an encapsulated phase change medium having a phase change temperature between a solid phase and a liquid phase within a range of 20 degrees Celsius to 40 degrees Celsius and a thermal conduction medium. The base fluid comprises one of a vegetable oil or a synthesized oil. The encapsulated phase change medium is a plurality of microspheres containing a paraffin, the microspheres having a size within a range of 14 microns to 24 microns. The thermal conduction medium is a graphite particulate having a size of 1 micron or less, the thixotropic fluid exhibiting a viscosity in a range of about 100,000 to 300,000 cP. In one aspect, the flexible polymer envelope is a central pad positioned on a foundation cushion. In another aspect, the flexible polymer envelope is at least one secondary pad that is supported on a central pad, the central pad defining an interior space filled with a fluid comprising a thermal conduction medium.

In another embodiment, a cushion of a wheelchair seat or backrest comprises a flexible polymer envelope and a thixotropic fluid contained within the flexible polymer envelope. The thixotropic fluid includes a base fluid containing an encapsulated phase change medium having a phase change temperature between a solid phase and a liquid phase within a range of 20 degrees Celsius to 40 degrees Celsius and a thermal conduction medium. The encapsulated phase change medium is a paraffin encapsulated in a fluid insert configured as a fluid pad having a surface area of at least 400 mm$^2$ and positioned proximate to a user heat source and in contact with the base fluid and the thermal conduction medium. The thermal conducting medium being graphite powder. In one aspect, the base fluid comprises a vegetable oil such that the thixotropic fluid has a viscosity in a range of about 100,000 to 300,000 cP.

Various aspects of this invention will become apparent to those skilled in the art from the following detailed description of the preferred embodiment, when read in light of the accompanying drawings.

DETAILED DESCRIPTION OF THE PREFERRED EMBODIMENTS

Figure 1:
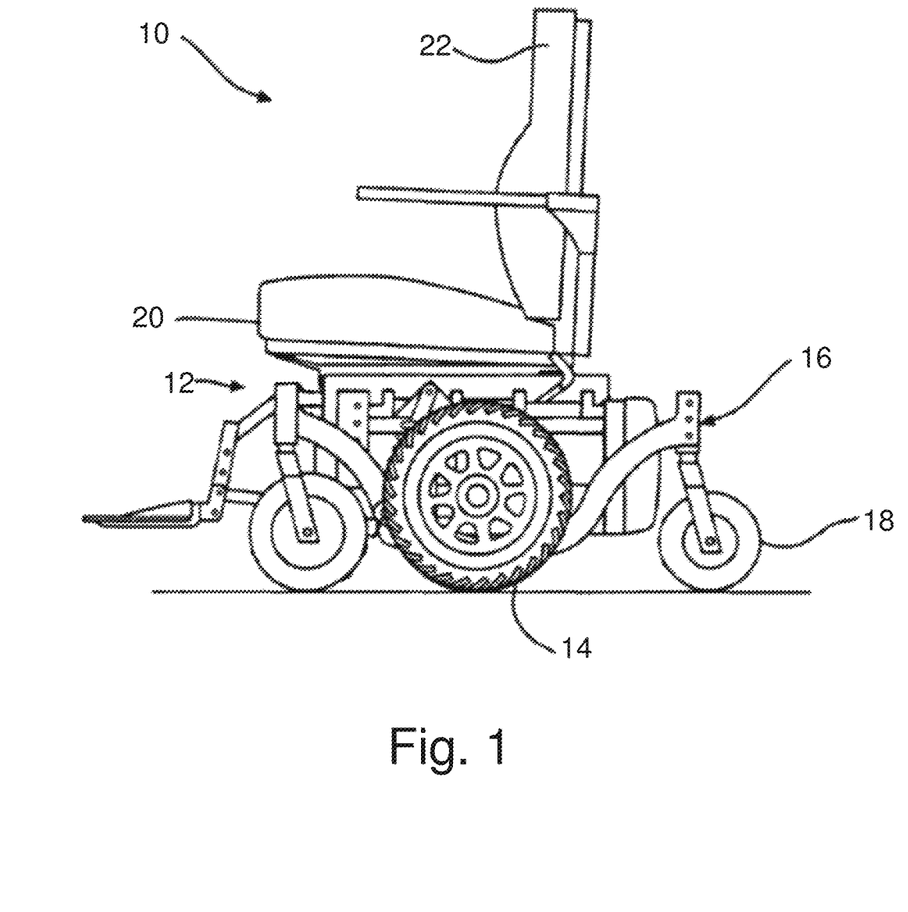
FIG. 1 is an elevational view of a personal mobility vehicle having a thermally responsive seating system according to the invention.

Referring now to the drawings, there is illustrated in FIG. 1 a personal mobility vehicle 10, shown generally as a wheelchair, and specifically a mid-wheel drive power wheelchair. The personal mobility vehicle 10, however, may be any type of personal conveyance, such as any wheelchair, scooter, or other devices for accommodating a seated user, particularly those directed toward users having ambulatory challenges. The wheelchair 10 includes a frame assembly 12 supporting at least one drive wheel 14 and a suspension configured as a caster arm 16 and caster wheel 18. The caster arm 16 and caster wheel 18 are shown as rear suspension components and a similar arrangement is positioned on the front end of the wheelchair 10. Additionally, this suspension arrangement is shown on the left-hand side of the wheelchair 10 and may be duplicated on the right-hand side. It should be understood that the wheelchair 10 may be any form of wheelchair or seating device, with or without a suspension or wheels. A seat cushion assembly 20, that is a cushion assembly of the thermally responsive seating system, is supported on the frame 12. A backrest assembly 22, which may also include a cushion assembly similar to the seat cushion assembly 20, is supported by the frame 12.

Figures 2A, 2B:
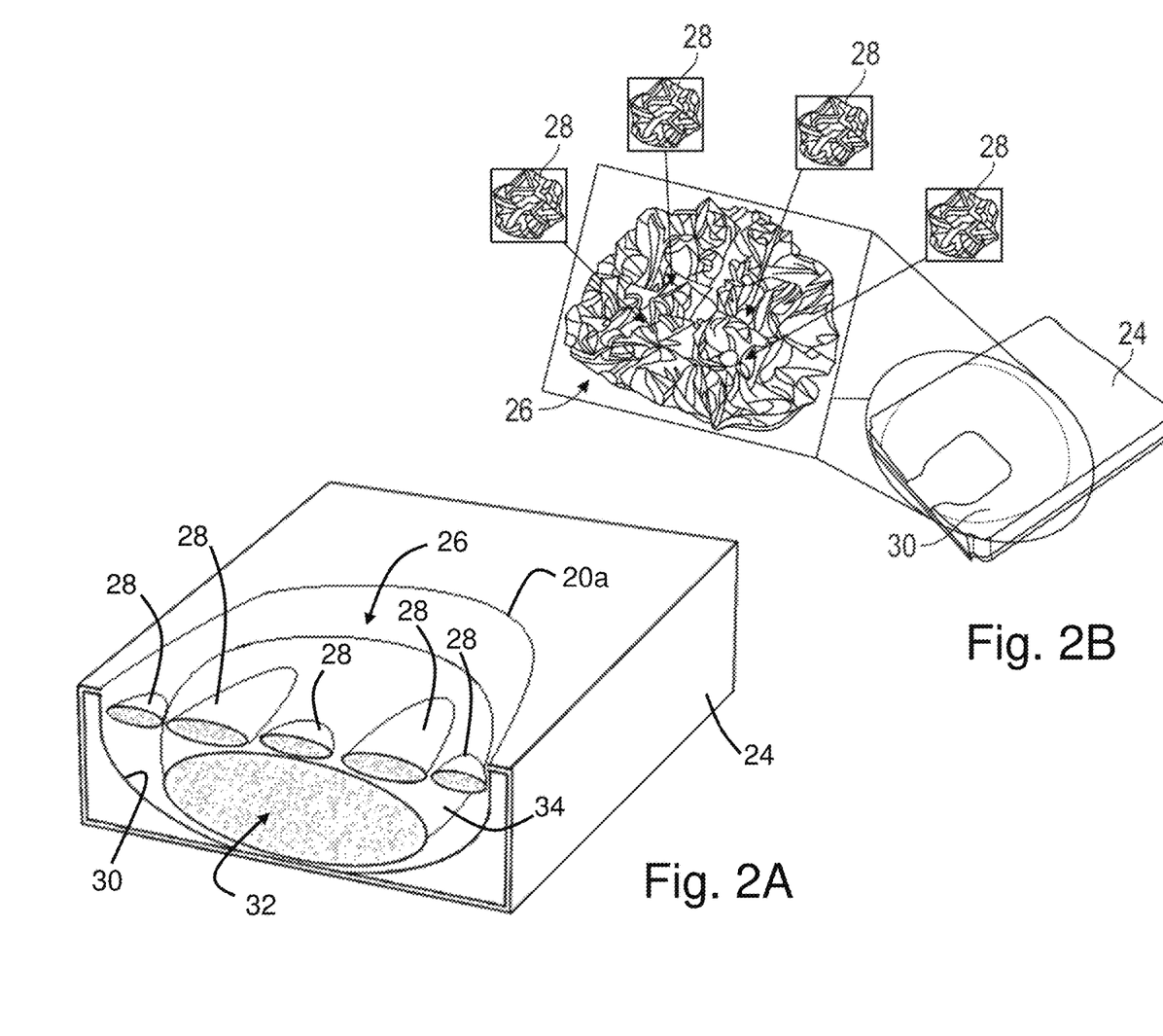
FIG. 2A is schematic illustration of a first embodiment of a cushion assembly of the thermally responsive seating system of FIG. 1.
FIG. 2B is an exploded view of the cushion assembly of FIG. 2A.

Referring now to FIGS. 2A and 2B, an embodiment of the seat cushion assembly 20 is illustrated having a foundation cushion 24 that supports a central pad 26 and a plurality of secondary pads 28. Though illustrated as being arranged on the central pad 26, the secondary pads 28 may be positioned at any suitable location on the foundation cushion 24. While the seat cushion assembly 20 is shown having a plurality of cushion elements, such is not required. The seating structure may alternatively comprise a single fluid-filled envelope of any size, shape, and thickness. In the illustrated embodiment, the foundation cushion 24 includes a recessed portion 30 configured to position the central pad 26. In certain embodiments, the recessed portion 30 positions both the central pad 26 and the plurality of secondary pads 28 on the foundation cushion 24. The recessed portion 30 is sized such that the central pad 26, and in certain instances the plurality of secondary pads 28, can be inhibited from undesirably shifting out of position during use. The recessed portion 30 is illustrated near a rear edge of the foundation cushion which is typically proximate to the ischial tuberosities of a user. The recessed portion 30, however, may be positioned anywhere on the foundation 30, if so desired. The seat cushion assembly 20 is contained within a covering 20a, such as an upholstered fabric that provides comfort, wicks away moisture, improves thermal energy transfer from the user to the pads 26, 28; and/or protects the underlying pads from puncture or wear. The covering 20a, as will be described below, may be formed in a single layer or multiple layers.

Figures 3, 4:
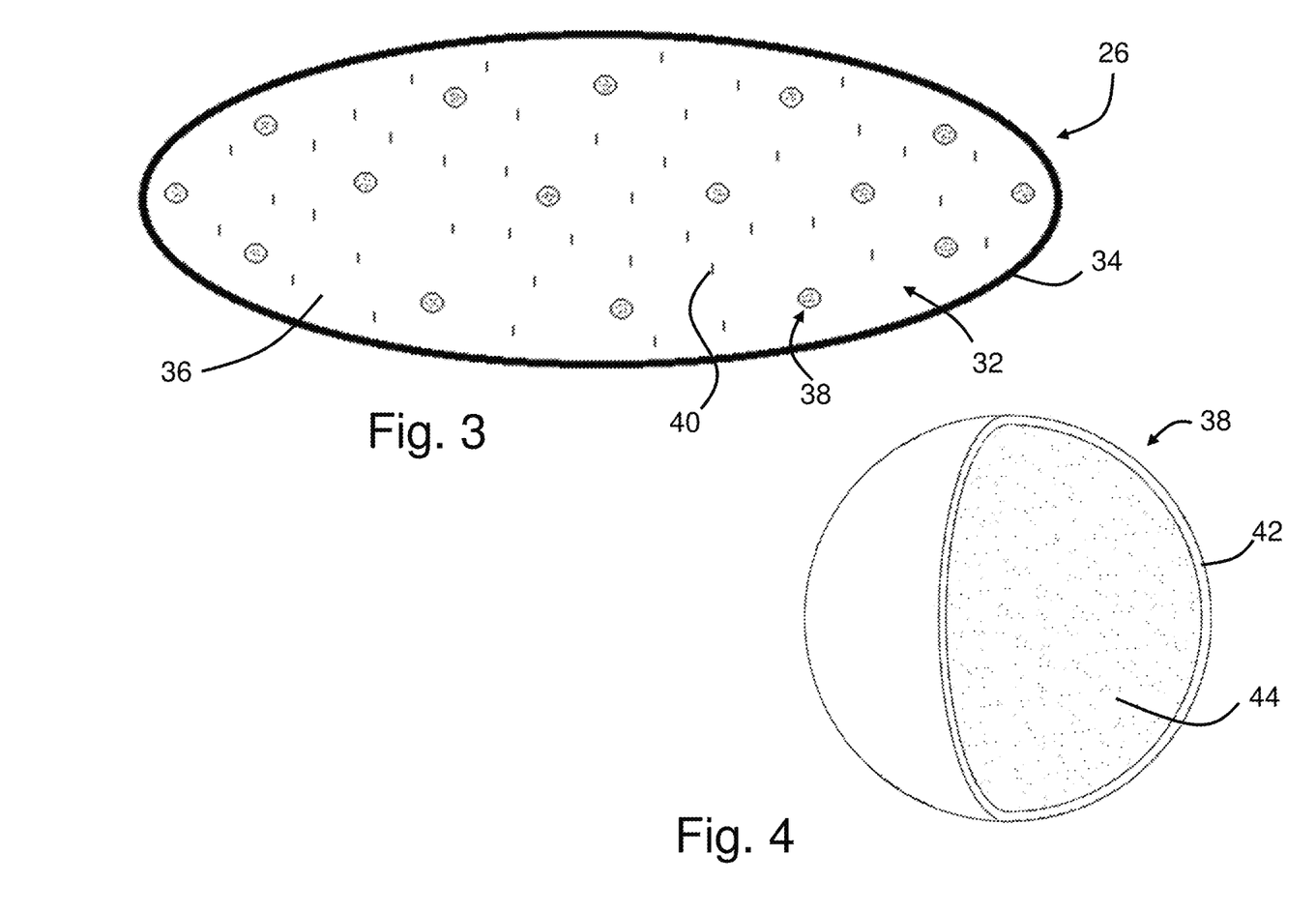
FIG. 3 is an enlarged, schematic illustration of a fluid component of the thermally responsive seating system of FIG. 1.
FIG. 4 is a schematic illustration, in partial cross section, of an encapsulated phase change constituent of the fluid component of FIG. 3.

The central pad 26 is similar in construction to the secondary pads 28 and will be described in detail, which is applicable to certain embodiments of the secondary pads 28. Referring to FIG. 3, the central pad 26 is configured as a fluid pad having a pressure-compensating and temperature regulating fluid composition 32 contained within an outer containment structure 34, such as a flexible polymer envelope. The fluid pads 26 and 28 may have the same or different fluid formulations that provide both support and temperature control of a seated user. For example, the secondary pads 28 positioned under a user's ischial tuberosities may be formulated to provide a greater degree of cooling than other secondary pads or the central pad.

In one embodiment, the fluid 32 comprises a base oil 36 mixed with an encapsulated phase change medium 38 and a thermal conduction medium 40. The fluid 32 exhibits a thixotropic consistency, similar to grease, such that the fluid deforms under pressure (similar to a fluid) and retains its shape when the pressure is removed (similar to a solid). This thixotropic consistency permits fluid to accommodate the specific shape of a user yet provide support of a user's weight as the fluid volume is restricted or otherwise contained within the outer envelope 34.

The base oil 36 may be formed from a synthesized or manufactured oil or may be a naturally occurring oil, that may or may not be a processed oil, such as a plant or vegetable oil. In certain embodiments, the base oil 36 may be a polyalphaolefin (PAO) oil, polybutene oil, dialkyl carbonate oil, and/or a paraffinic mineral oil. Alternatively, the base oil 36 may be canola vegetable oil, or other vegetable oils such as olive, corn, safflower, rapeseed, sunflower, castor, soy, coconut, palm oils and mixtures thereof. The base oil 36 may comprise or also include other constituents, such as silicone oil or grease, medium chain triglycerides (MCT) to adjust viscosity, BHA (butylated hydroxyanisole) and BHT (butylated hydroxytoluene) antioxidants as preservative agents.

In one embodiment, the fluid 32 further contains the encapsulated phase change medium 38 in the form of a plurality of encapsulated microspheres filled with a phase change material (PCM Microspheres). As shown in FIG. 4, the encapsulated phase change medium 38 is an encapsulant or a microsphere 42 containing a phase change material 44. The microsphere 42 is illustrated as a generally round spheroidal structure though any other suitable geometric shape or an amorphous-shaped containment structure may be used. The microsphere 42 may be formed from a polymer material, plastic, ceramic or glass. In one specific example, the polymer may be a PAN/PMMA (polyacrylonitrile and polymethylmethacrylate) shell similar to microballoons sold by Nobel Industries under the commercial name Expancel 091 DE microballoons. Alternatively, the microsphere 42 may be a metal, metalized polymer, coated polymer (such as a graphite coated or impregnated polymer), carbon, carbonfiber, or other thermally conductive material.

The microsphere 42 contains the phase change material 44. Alternatively, the microsphere 42 may contain the phase change material 44 and may also contain other materials such as a gas, like air, carbon dioxide, isobutene, or other gases or a liquid, such as an oil or other constituent that can improve the thermal conductivity properties of the microsphere. In one embodiment, the phase change material 44 may be in the form of a material having melting temperature in a range of about 24° C. to about 34° C. and in another aspect having a range of about 28° C. to about 31° C. In one specific embodiment, the material may be a paraffin having a melting temperature of about 28° C. In one aspect of the invention, the phase change material 44 is a microencapsulated phase change material having properties similar to the MPCM28 product produced by MicroTek of Dayton, Ohio. The microspheres 24 may be in any size range suitable to mix in the thixotropic fluid without being perceptible as individual elements in the fluid. In one embodiment, the size range may be about 5-50 microns, and preferably about 10-30 microns, and more preferably about 14-24 microns.

The fluid 32 also contains the thermal conduction medium 40, which in one embodiment is graphite. The graphite may be in the form of a particle, such as a nanoparticle, and may be a powder mixed into the base oil 36. In one embodiment, the graphite may be a nanoparticle powder having a particle size less than 1 micron. As an example, the graphite material may be similar to TC307 graphite powder produced by Asbury Graphite Mills, Inc. of Asbury, N.J. In other embodiments, the graphite powder may be in a size range of 5-50 microns. Alternatively, carbon graphite nanotubes, industrial diamond particulates, graphene or similar carbon derivatives may be used. In yet another embodiment, the thermal conduction medium 40 may be in the form of graphite structures, either as a chopped fiber or as flakes mixed with the base oil, either with or without a nanoparticle carbonbased powder. Alternatively, the thermal conduction medium 40 may further include long graphite fibers, either woven into a series of nets or dispersed throughout the fluid in various layers within the outer envelope 34. In another embodiment, the thermal conduction medium 40 may include metallic nanoparticle powders such as aluminum, copper, silver, boron nitride, and tin. These various constituent embodiments may be used singularly or in any combination.

The composition of the fluid 32 is formulated to provide a viscosity suitable to create the thixotropic characteristic that provides support to a user yet isolates portions of the user, particularly the ischial tuberosities, from contacting or otherwise being unduly loaded against the hard support surface, such as the seat pan or frame structure. The addition of PCM Micro spheres 38 to the base oil 36 influences the overall viscosity of the fluid 32. Increases in fluid viscosity influences the support characteristics of the cushion assembly 20, particularly where boney protuberances, such as the ischial tuberosities, are involved in supporting a seated weight of the user. Thus, there is a desired range of viscosity to support the weight of a user and provide isolation to these pressure points. A target dynamic viscosity of about 100,000 to 300,000 Cp provides a desired seating feel to the user and tends to support areas around boney protuberances, such as the ischial tuberosities, which minimizes focused pressure on the skin against these protuberances. The addition of PCM Microspheres 38 and the graphite thermal conduction medium 40 may increase the fluid viscosity. This effect may be compensated for by adding, for example, middle chain triglycerides to reduce viscosity. Thus, balancing the PCM Microspheres 38 and the graphite medium 40 with the viscosity creates a proper cooling effect while maintaining the support and isolation characteristics provided by the thixotropic characteristic of the fluid 32.

In one embodiment, the weight fraction of PCM Microspheres 38 added to the base oil 36 is in a range of about 30%-40% and produces a viscosity in the range of about 100,000 to 300,000 Cp. In one embodiment, an upper limit of weight fraction of PCM Microspheres 38 is about 56.5%. The weight fraction of thermal conduction medium 40 in the form of graphite micro-particles is in a range of about 15%-25%. In a more specific embodiment, the PCM Microspheres 38 are added in a weight range of 34.8% and the thermal conduction medium 40 consisting of graphite nanoparticles is added in a weight fraction of about 21.7%. The remainder of the fluid 32 is the base oil 36 and other additives.

Figure 5:
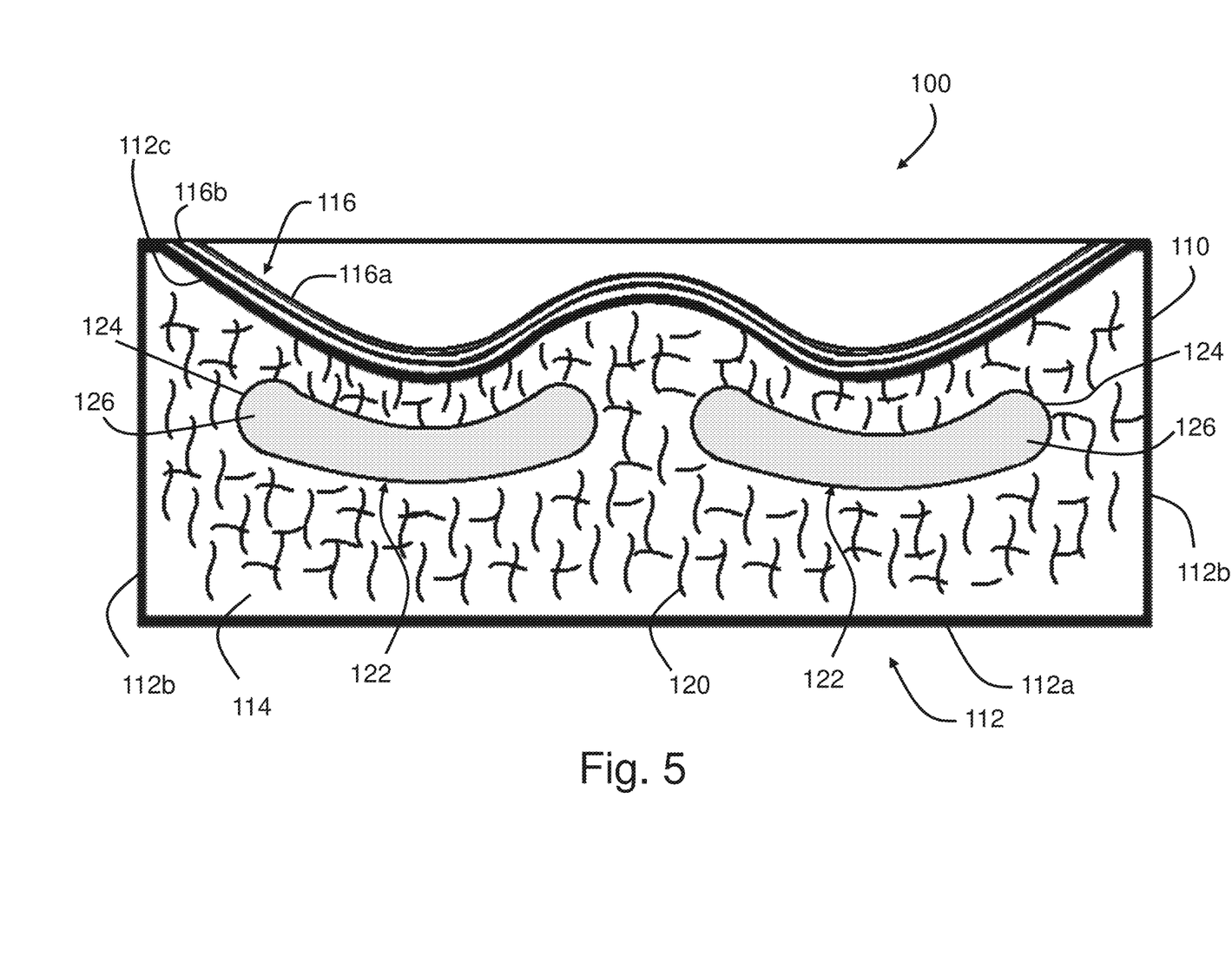
FIG. 5 is a schematic illustration of a second embodiment of a cushion assembly, shown in cross-section, as part of a thermally responsive seating system according to the invention.

Referring again to the drawings, FIG. 5 illustrates another embodiment of a seat cushion assembly, shown generally at 100. The seat cushion assembly 100 includes a fluid containment envelop 110 that encapsulates a pressure-compensating fluid composition 120 and a temperature regulating fluid insert 122, cooperating to produce user support and thermal control similar in overall effect to fluid 32 described above. In one embodiment, the envelope 110 may be a flexible polymer envelope similar to the outer containment structure 34, above and further supported on a foam base such as foundation 30. In the illustrated embodiment, the envelope 110 includes a base 112a that may be formed from a thermally conductive material, such as a woven carbon fiber fabric having a fluid impervious lining or surface to contain the fluid 120. The base 112a may be rigid or flexible. The base 112a transitions into side walls 112b that may be formed similar to the base 112a. Alternatively, the side walls 112b may be more flexible than the base 112a. The side walls 112b transition into an upper surface 112c that completes an envelope 112 defining a fluid reservoir 114 configured to contain the fluid composition 120 and fluid insert 122. A fabric cover 116 may enclose the entire envelope or be applied onto the upper surface 112c. The fabric cover 116 may include multiple layers tailored to specific functions or may be a single layer having the functional characteristics. An outer layer 116a may be configured to provide a soft tactile sensation that further provides thermal conduction to the envelope 112. The upper surface may cover a moisture wicking layer 116b. The orientation of these layers may be changed if so desired.

In one embodiment, the fluid composition 120 is formulated as the fluid characterized in U.S. Pat. No. 5,869,164 to Nickerson, et al. with the addition of the thermal conduction medium 40, described above. Alternatively, the fluid composition 120 may be the base oil 36 and the thermal conduction medium 40 described herein and adjusted, by any appropriate means, to have a viscosity in a range of about 100,000 to 300,000 cP. In one embodiment, the fluid insert 122 includes a phase change material 126 similar to the phase change material 44 and the various examples of phase change material 44 described above, and may optionally include the thermal conduction medium 40. The fluid insert 122 includes an envelope 124 containing a phase change material 126 similar to. The volume of phase change material 126 is greater than the volume used in the PCM Microspheres 38 and defines a surface area of at least 400 mm². The fluid inserts 126 are in contact with or immersed in the fluid composition 120 to effect heat energy transfer from the user through the fluid composition 120 and to the fluid inserts 122. The fluid inserts 122 may be placed in areas of the seat known to exhibit high thermal loading. In the illustrated embodiment, the fluid inserts 122 are located beneath the ischial tuberosities, though any other location may be provided.

Figure 6:
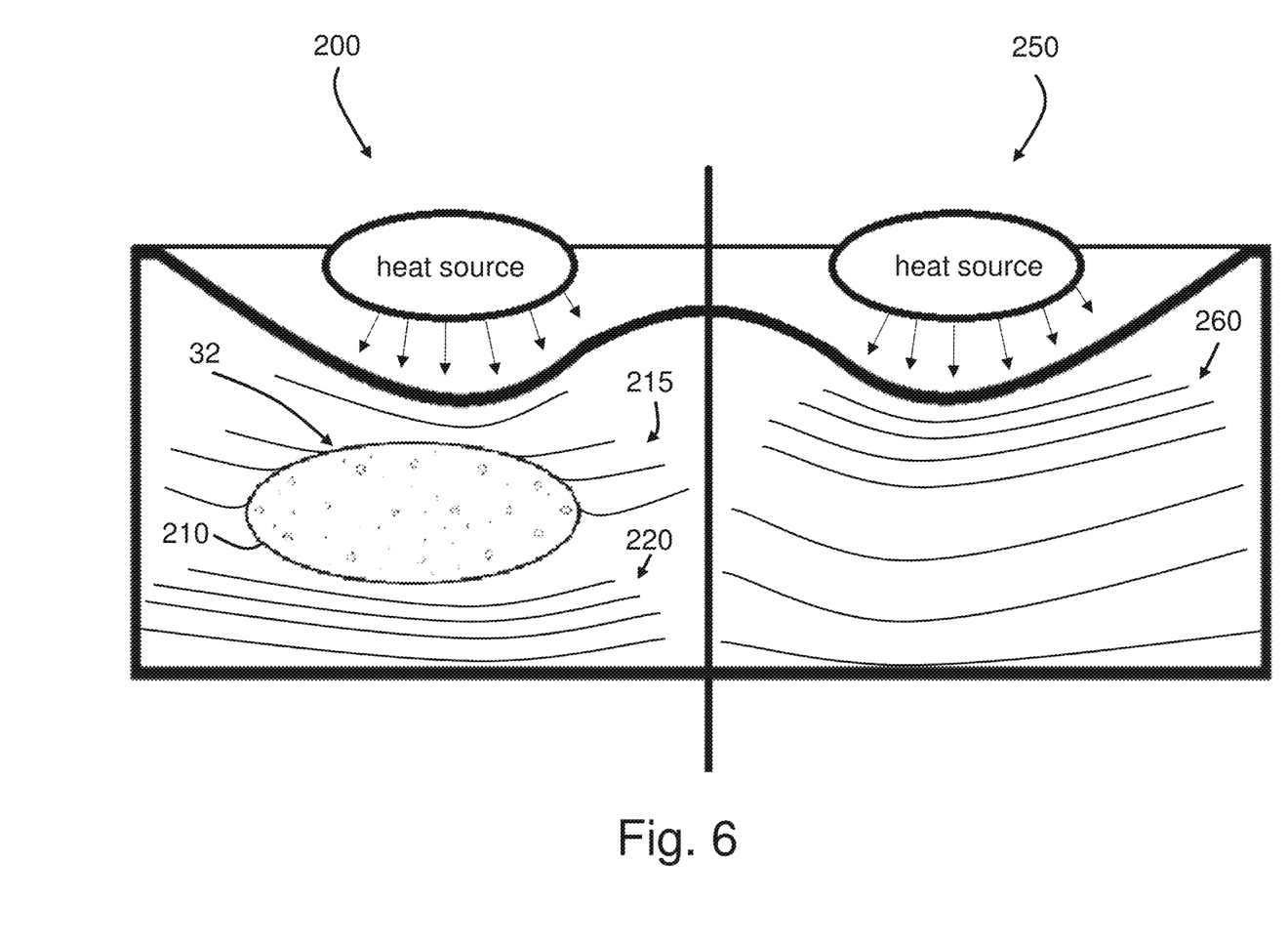
FIG. 6 is a comparative schematic illustration of a cushion assembly according to the invention and a prior art cushion subjected to a heat source.
Figure 7:
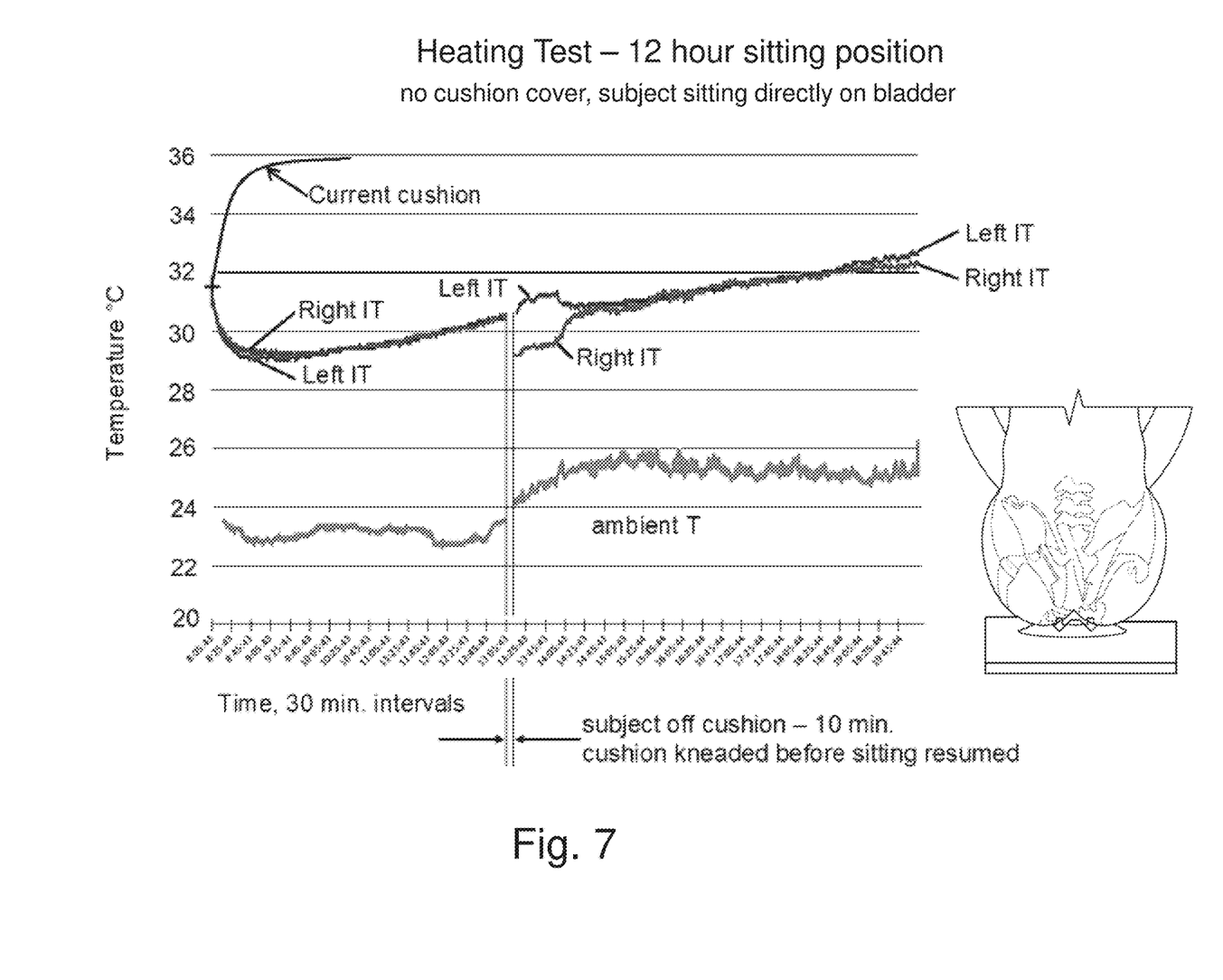
FIG. 7 is a graph comparing temperature responses over time of a prior art cushion and an embodiment of a cushion assembly according to the invention.

Referring now to FIG. 6, a schematic illustration of a seat cushion assembly 200, similar to the seat cushion assemblies 20 and 100 described above, and a conventional fluid-filled seat cushion 250 without phase change material shows a comparison of heat signatures of the seat in response to a heat source such as a seated user. In the illustrated schematic, the seat cushion assembly 200 includes a pad 210, similar to the central pad 26 and containing fluid 32. As shown in the illustration and supported by test data, particularly the data of FIG. 7, isothermal lines 215 show a progression of moving heat from the seated user to the pad 210 where the fluid 32 absorbs the heat and consumes the thermal energy by changing from a solid phase to a liquid phase. The isothermal lines 220 indicate that the seat cushion assembly, which may further have phase change material in pad (not shown) is maintained in a temperature state near the seat cushion starting temperature. This condition further promotes heat migration away from a user. By comparison, the fluid seat cushion 250 shows a gradual heating of the entire seat thickness as isothermal lines 260 exhibit a wider temperature range across the seat cushion. The temperature of the cushion 250 near the heat source is closer, in magnitude, to the temperature of the user and the fluid exhibits a thermal insulating effect producing a wider temperature gradient, as shown by the farther spacing of the isothermal lines.

Referring now to FIG. 7, a graph 34 of the temperature of the seating systems depicted in FIG. 6 versus time is illustrated. As shown by the seated subject insert figure, thermocouples were located under the user ischial tuberosities to measure the amount of heat radiating from the user and being conducted into the seat cushion. Under these test conditions a user was seated on a fluid-filled cushion bladder, similar in construction to the central pad 26, having a polymeric envelope filled with different fluid media. The starting temperature measurement for both plots is approximately 31° C. As indicated by the lowest temperature plot, the ambient temperature was measured from about 23° C. to about 26° C. (about 73° F.-79° F.).

The plot related to "current cushion" was tested on a Jay® Fusion® fluid-filled bladder, produced by Sunrise Medical of Fresno, Calif. The fluid used in the Jay® Fusion® cushion is formulated generally in accordance with the fluid described in U.S. Pat. No. 5,869,164 to Nickerson, et al. The "current cushion" temperature plot shows the temperature progression under the user from the starting temperature of 31° C. progressing rapidly to 36° C. (96.8° F.), near the average body temperature of 37° C. (98.6° F.). As can be appreciated, the temperature plot directly relates to what the user perceives as the surface temperature of the seat. Thus, the "current cushion" rapidly begins to feel warmer within a 30 min. to 1 hour sitting period. By the 3 hour time interval, the cushion temperature has plateaued to around 36° C., yielding no temperature relief to the user.

The temperature plots labeled "Left IT" and "Right IT" represent a fluid formulation similar to fluid 32, above. Specifically, the embodiment of fluid 32 represented by the plots of FIG. 7 is comprised of the following weight percentages of constituents:

base fluid 36: 46% Radiamuls MCT having approx. 14 cSt viscosity, produced by Oleon; 1% Dow200/500 medium viscosity, polydimethylsiloxane polymer silicone fluid having a 500 cSt viscosity, produced by Dow Corning; and 1% Dispersun300

PCM Microbeads 38: 46% paraffin beads thermally conductive material 40: 7% graphite The temperature measurements between the seated user and the cushion surface indicate a substantial heat transference into the cushion by the graphite and the phase change material. Over a 12 hour testing period, the measured temperature progressed from a low temperature of approximately 29° C. to a high of less than 33° C. This marked difference as compared to the standard cushion clearly shows that the combination of phase change material, acting as a heat sink, and the graphite, acting as a transfer conductor, produces a seat that feels cool and comfortable to the user over a prolonged time period.

Figure 8:
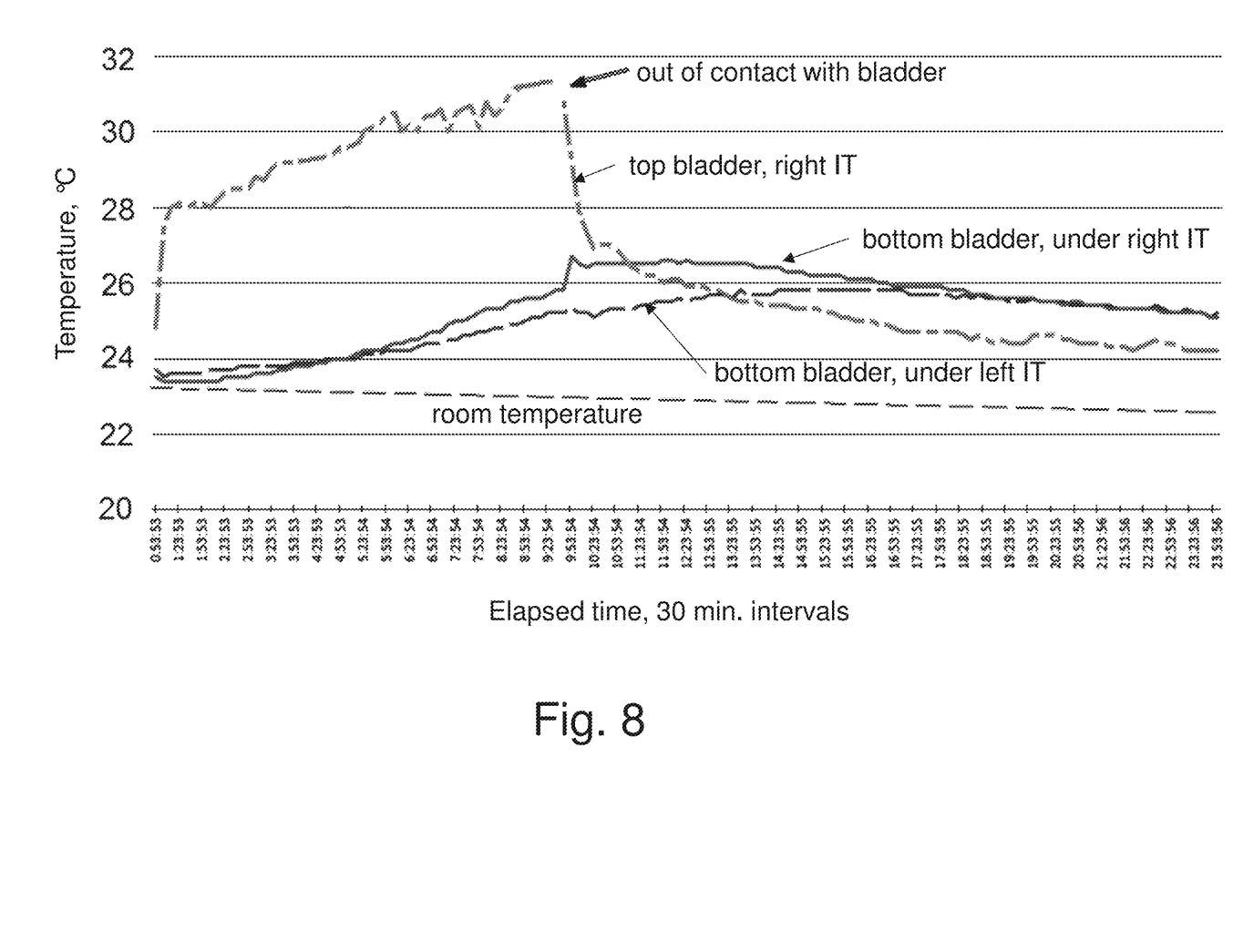
FIG. 8 is a graph comparing temperature responses over time of another embodiment of a cushion assembly according to the invention.

Referring now to FIG. 8, the graph shows the effect of energy release from an embodiment of a pressure-compensating and temperature regulating fluid composition, similar to fluid 32 after exposure to a heat source. Temperature measurements were taken on both sides of a bladder, similar in construction and composition to central pad 26 filled with fluid 32. The cushion was subjected to user heat for approximately 9 hours from start to the point referenced as "out of contact with bladder." A temperature measurement corresponding to a point between the user's right ischial tuberosity and the seating surface of the bladder are labeled as "top bladder, right IT." Measurements of the underside of the bladder, labeled in part as "bottom bladder, . . . ," show the amount of thermal energy 1) absorbed by the phase change material, 2) released by the phase change material after removal of the heat source, and 3) conducted through the thickness of the fluid material over time. The effectiveness of the phase change material can be seen as a slowly dropping temperature under the bladder that tracks a similar measurement on the upper side over a 14 hour period after removal of a 9 hour seated condition. The difference in the upper and lower temperature readings is related to the upper surface direct exposure to ambient conditions vs. the lower side being positioned between the pad and the support. The effectiveness of the graphite in transmitting heat away from the PCM Microspheres to the ambient heat sinks is readily apparent.

Figure 9:
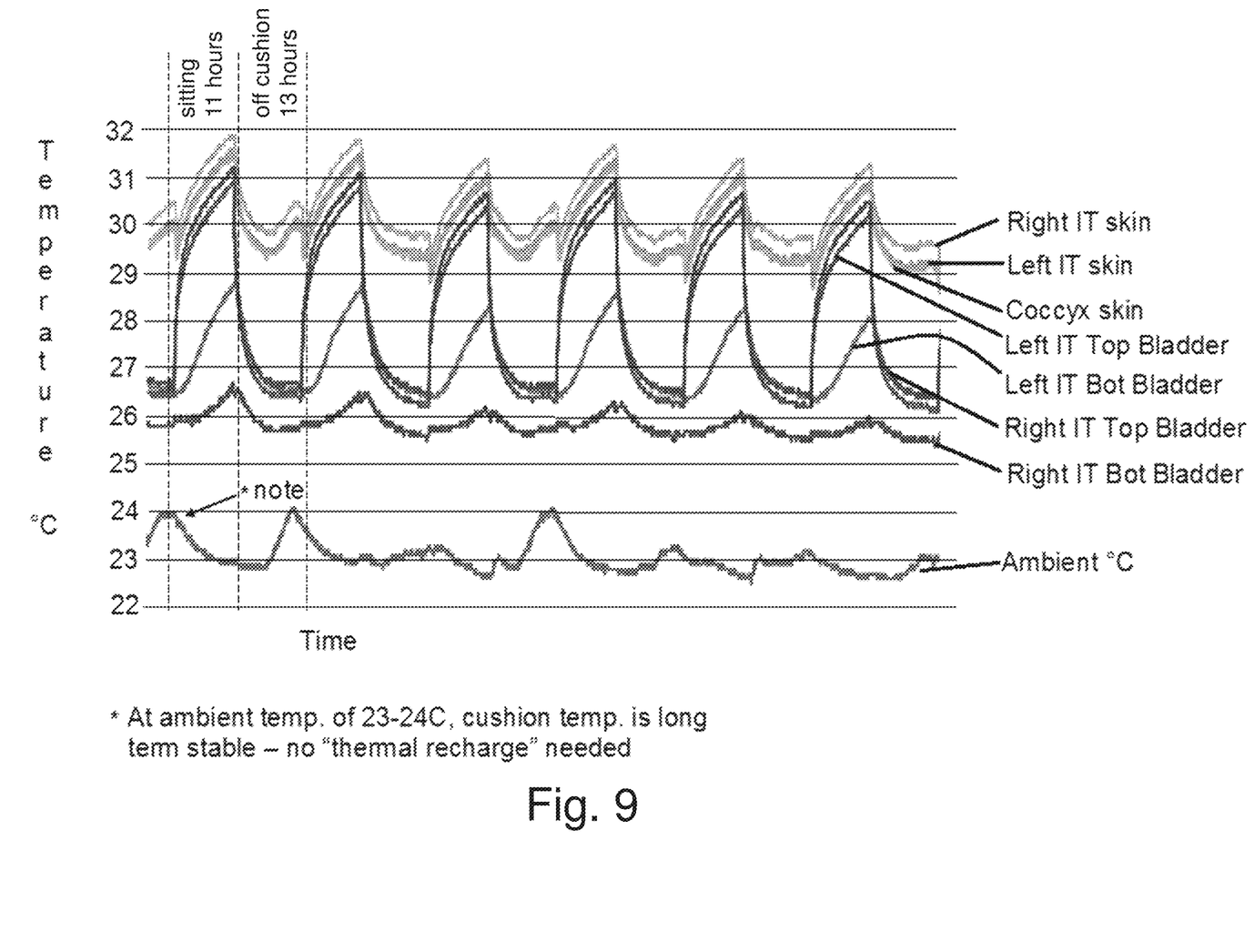
FIG. 9 is a graph showing cyclic thermal recovery of an embodiment comparing the temperature over a period of time of a cushion assembly of a thermally responsive seating system in accordance with the invention.

The ability of a seat cushion to absorb and conduct heat away from the user is limited by the time required to "recharge" the cushion, i.e., return the fluid to a stabilized initial use temperature, such as room temperature, and convert the phase change material back into its previous physical state—solid in the case of the PCM Microspheres 38. Referring now to FIG. 9, the graph shows a series of thermal cycling events followed by subsequent ambient temperature recharging events. The graph illustrates that, over time, the seat cushion assembly 20 having the pressure-compensating and temperature regulating fluid composition 32 is able to fully recharge within the normal usage timeframe experienced by an average wheelchair user. The cycles represent 11 hours of seated time and 13 hours of room temperature exposure. There is no residual retention of thermal energy that would build over time requiring a refrigeration cycle during this period. This clearly demonstrates that in normal use, the seat cushion assembly is capable of providing long term effective skin cooling without requiring 'recharging' in a refrigerator overnight, or resting longer than would typically be seen when the user gets out of the chair overnight.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A cushion of a wheelchair seat or backrest comprising:
    a flexible polymer envelope; and
    a thixotropic fluid contained within the flexible polymer envelope, the thixotropic fluid having a viscosity in a range of about 100,000 to 300,000 cP and including a base fluid containing an encapsulated phase change medium having a phase change temperature between a solid phase and a liquid phase within a range of 20 degrees Celsius to 40 degrees Celsius and a thermal conduction medium comprising one of graphite, graphene, carbon graphite nanotubes, or industrial diamond particulates.

2. The cushion of claim 1 wherein the thermal conduction medium is a micro-sized particulate material having a particle size 1 micron or less.

3. The cushion of claim 1 wherein the thermal conduction medium is graphite having a particle size in a range of about 5-50 microns.

4. The seat cushion of claim 3 wherein the phase change medium is encapsulated in a plurality of microspheres.

5. The cushion of claim 4 wherein the phase change medium is a paraffin material contained within one of a polymer or plastic encapsulant and provided in a weight range of up to 46% of the base fluid.

6. The cushion of claim 4 wherein the plurality of microspheres are added to the base fluid in a weight range of about 30%-40%.

7. The cushion of claim 1 wherein the base fluid comprises one of a polyalphaolefin (PAO) oil, a polybutene oil, a dialkyl carbonate oil, and/or a silicone oil, the encapsulated phase change medium is a plurality of microspheres containing a paraffin, the microspheres having a size within a range of 14 microns to 24 microns, and the thermal conduction medium is a graphite particulate having a size of 1 micron or less.

8. The cushion of claim 1 wherein the base fluid comprises a vegetable oil, the encapsulated phase change medium is a plurality of microspheres containing a paraffin, the microspheres having a size within a range of 14 microns to 24 microns, and the thermal conduction medium is a graphite particulate having a size of 5-50 microns.

9. The cushion of claim 8 wherein the vegetable oil is one of canola, olive, corn, safflower, rapeseed, sunflower, castor, soy, coconut, palm oils, or a mixture of vegetable oils.

10. The cushion of claim 9 wherein the graphite particulate is in a weight fraction of up to 7% and the encapsulated phase change medium is in a weight fraction of up to 46%.

11. The cushion of claim 1 wherein the base fluid comprises one of a vegetable oil or a synthesized oil, the encapsulated phase change medium is a plurality of microspheres containing a paraffin, the microspheres having a size within a range of 14 microns to 24 microns, and the thermal conduction medium is a graphite particulate.

12. The cushion of claim 11 wherein the flexible polymer envelope is a central pad positioned on a foundation cushion.

13. The cushion of claim 11 wherein the flexible polymer envelope is at least one secondary pad, the at least one secondary pad supported on a central pad, the central pad defining an interior space filled with a fluid comprising a thermal conduction medium.

14. A wheelchair comprising:
    a frame supporting a drive wheel and a seat cushion, the seat cushion comprising:
        a flexible polymer envelope; and
        a thixotropic fluid contained within the flexible polymer envelope, the thixotropic fluid including a base fluid containing an encapsulated phase change medium and comprising a weight fraction of up to 46% of the weight of the thixotropic fluid, and a thermal conduction medium comprising one of graphite, graphene, carbon graphite nanotubes, or industrial diamond particulates having a weight fraction of up to 7% of the weight of the thixotropic fluid, the thixotropic fluid having a viscosity in a range of about 100,000 to 300,000 cP.

15. The wheelchair of claim 14 wherein the thermal conduction medium is a graphite particulate having a size of about 5-50 microns.

16. The wheelchair of claim 15 wherein the encapsulated phase change medium is a plurality of microspheres containing paraffin having a phase change temperature between solid and liquid within a range of 20 degrees Celsius to 40 degrees Celsius, the microspheres having a size within a range of 14 microns to 24 microns.

17. The wheelchair of claim 15 wherein the base fluid comprises a vegetable oil as one of canola, olive, corn, safflower, rapeseed, sunflower, castor, soy, coconut, palm oils, or a mixture of vegetable oils.

18. The wheelchair of claim 14 wherein the base fluid comprises one of a polyalphaolefin (PAO) oil, a polybutene oil, a dialkyl carbonate oil, and/or a silicone oil, the encapsulated phase change medium is a plurality of microspheres containing a paraffin, the microspheres having a size within a range of 14 microns to 24 microns, and the thermal conduction medium is a graphite particulate.

19. A cushion of a wheelchair seat or backrest comprising:
a flexible polymer envelope; and
a thixotropic fluid contained within the flexible polymer envelope, the thixotropic fluid including a base fluid containing an encapsulated phase change medium having a phase change temperature between a solid phase and a liquid phase within a range of 20 degrees Celsius to 40 degrees Celsius and a thermal conduction medium, wherein the encapsulated phase change medium is a paraffin encapsulated in a fluid insert, the fluid insert being configured as a fluid pad having a surface area of at least 400 mm2 and positioned proximate to a user heat source and in contact with the base fluid and the thermal conduction medium, the thermal conducting medium being graphite powder.

20. The cushion of claim 19 wherein the base fluid comprises a vegetable oil, the graphite powder having a size of about 5-50 microns, and wherein the thixotropic fluid has a viscosity in a range of about 100,000 to 300,000 cP.

* * * * *